(12) United States Patent
Hoffknecht et al.

(10) Patent No.: US 8,843,788 B2
(45) Date of Patent: Sep. 23, 2014

(54) SYSTEMS AND METHODS TO DETECT BUS NETWORK FAULT AND TOPOLOGY

(75) Inventors: Marc Hoffknecht, Newmarket (CA); Javier Orlando Rojas, Mississauga (CA); Liam John O'Hagan, Walkerton (CA)

(73) Assignee: OSRAM SYLVANIA Inc., Danvers, MA (US)

( * ) Notice: Subject to any disclaimer, the term of this patent is extended or adjusted under 35 U.S.C. 154(b) by 397 days.

(21) Appl. No.: 13/161,321

(22) Filed: Jun. 15, 2011

(65) Prior Publication Data
US 2012/0324296 A1   Dec. 20, 2012

(51) Int. Cl.
*G06F 11/00* (2006.01)
*H04L 1/24* (2006.01)
*G06F 11/07* (2006.01)
*H04L 1/00* (2006.01)

(52) U.S. Cl.
CPC ..... *G06F 11/0745* (2013.01); *H04L 2001/0094* (2013.01); *H04L 1/24* (2013.01); *G06F 11/0793* (2013.01)
USPC .......................................................... 714/43

(58) Field of Classification Search
USPC ............................................. 714/43, 48, 1, 2
See application file for complete search history.

(56) References Cited

U.S. PATENT DOCUMENTS

| | | |
|---|---|---|
| 4,407,447 A | 10/1983 | Sayegh |
| 5,059,871 A | 10/1991 | Pearlman et al. |
| 5,572,438 A | 11/1996 | Ehlers et al. |
| 5,682,949 A | 11/1997 | Ratcliffe et al. |
| 5,701,058 A | 12/1997 | Roth |
| 5,703,442 A | 12/1997 | Notohamiprodjo et al. |
| 5,812,422 A | 9/1998 | Lyons |
| 5,962,989 A | 10/1999 | Baker |
| 6,118,230 A | 9/2000 | Fleischmann |
| 6,121,874 A * | 9/2000 | O'Donnell .................... 340/506 |
| 6,181,086 B1 | 1/2001 | Katyl et al. |
| 6,208,905 B1 | 3/2001 | Giddings et al. |
| 6,359,564 B1 | 3/2002 | Thacker |
| 6,388,396 B1 | 5/2002 | Katyl et al. |
| 6,388,399 B1 | 5/2002 | Eckel et al. |
| 6,583,573 B2 | 6/2003 | Bierman |
| 6,792,319 B1 | 9/2004 | Bilger |
| 7,085,863 B2 * | 8/2006 | Barenys et al. ............... 710/104 |
| 7,324,335 B2 * | 1/2008 | Sueyoshi ................. 361/679.33 |
| 7,565,457 B2 * | 7/2009 | Ooi et al. ......................... 710/15 |
| 2002/0047628 A1 * | 4/2002 | Morgan et al. ............... 315/291 |
| 2002/0108076 A1 * | 8/2002 | Barenys et al. ................. 714/43 |
| 2005/0122064 A1 | 6/2005 | Chevalier et al. |

(Continued)

OTHER PUBLICATIONS

USPTO; Office Action dated Mar. 2, 2006 in U.S. Appl. No. 10/425,631.

(Continued)

*Primary Examiner* — Yolanda L Wilson
(74) *Attorney, Agent, or Firm* — Shaun P. Montana

(57) ABSTRACT

Systems for helping identify faults on a bus, as well as to determine the topology of a bus network, are disclosed. A system according to one embodiment includes a bus interface for connecting to a bus and a switch coupled to the bus interface, the switch configured to alternate between an open state and a closed state. The system is connected to the bus via the bus interface when the switch is in the closed state, and the system is disconnected from the bus via the bus interface when the switch is in the open state.

11 Claims, 4 Drawing Sheets

(56) References Cited

U.S. PATENT DOCUMENTS

2005/0144495 A1* 6/2005 Nakajima et al. ............. 713/340
2009/0292838 A1   11/2009 Wong
2011/0112700 A1*  5/2011 Tajima .......................... 700/293
2011/0210717 A1*  9/2011 Hilton et al. ................... 324/66

OTHER PUBLICATIONS

USPTO; Office Action dated Dec. 6, 2005 in U.S. Appl. No. 10/425,631.
USPTO; Final Office Action dated Nov. 7, 2006 in U.S. Appl. No. 10/425,631.
Uspto; Office Action dated Feb. 27, 2007 in U.S. Appl. No. 11/514,145.
EPO; Examination Report dated Jun. 20, 2008 in EPO Application No. 2003737777.7.
PCT; International Search Report dated Aug. 21, 2003 in PCT Application No. PCT/CA/2003/000922.
PCT; Written Opinion dated Aug. 2, 2004 in PCT Application No. PCT/CA/2003/000922.
PCT; International Preliminary Examination Report dated Sep. 20, 2004 in PCT Application No. PCT/CA/2003/000922.
"Dali Command MultiDim Intelligent Lighting Control System," Philips Dali Command MultiDim, Apr. 2002, pp. 1 to 11.
Cristiana Lai, International Search Report and Written Opinion of the International Searching Authority for PCT/US12/42583, Jan. 23, 2013, pp. 1-15, European Patent Office, Rijswijk, The Netherlands.

* cited by examiner

| NODE WITH SWITCH OPEN | NODE WITH COMMUNICATION INTERRUPTED |
|---|---|
| 1 | 3,5,6,7 |
| 2 | 1,3,4,5,6,7 |
| 3 | 6 |
| 4 | - |
| 5 | 3,6,7 |
| 6 | - |
| 7 | - |

| NODE | DIRECT CHILDREN | PARENT |
|---|---|---|
| 1 | 5 | 2 |
| 2 | 1,4 | HEAD END EQUIPM. |
| 3 | 6 | 5 |
| 4 | - | 2 |
| 5 | 3,7 | 1 |
| 6 | - | 3 |
| 7 | - | 5 |

SYSTEMS AND METHODS TO DETECT BUS NETWORK FAULT AND TOPOLOGY

BACKGROUND

Bus networks are used in a variety of fields and applications to interconnect devices and allow communication, power transmission, and other functionality. One such bus network is known as a Digital Addressable Lighting Interface (DALI), which is a bus architecture standard used in controlling devices in a building (such as sensors, lighting devices, and shades). DALI provides a two-wire bus that allows power to be supplied to, and communication between, devices on the bus. In the DALI architecture, the presence of voltage indicates a first state (i.e., a logical "1"), while the shorting of the two wires by any device on the bus indicates a second state (i.e., a logical "0"). In this manner, devices can use the two-wire DALI bus to communicate with each other.

Faults in a communication system can be numerous, and include wiring faults, short circuits between the conductors of the bus, open circuits, wire loops, breaks, and interference (e.g., from nearby motors or other devices). In some bus networks, such as a DALI lighting control bus, RS485 networks and others, nodes may branch off from a trunk. If the trunk is shorted, communication can be impossible and locating the fault tedious and time consuming.

Likewise, determining the manner in which the nodes of a bus network are interconnected (known as the "topology" of the network) is useful for a variety of purposes, but can be both difficult and time consuming using conventional systems and methods. In installations that include large numbers of nodes, such as a lighting control network, or installation with long wires, problems due to faults and determining bus topology can be exacerbated.

Embodiments in this disclosure address these and other issues.

BRIEF SUMMARY

Among other things, embodiments in this disclosure help identify faults on a bus, as well as to determine the topology of a bus network. A system according to one embodiment includes a bus interface for connecting to a bus and a switch coupled to the bus interface, the switch configured to alternate between an open state and a closed state. The system is connected to the bus via the bus interface when the switch is in the closed state, and the system is disconnected from the bus via the bus interface when the switch is in the open state.

A method according to an embodiment comprises coupling plurality of devices to a bus, wherein at least one of the plurality of devices includes: a bus interface, a transceiver coupled to the bus interface, the transceiver for transmitting and receiving data via the bus interface, and a switch coupled to the bus interface, the switch configured to alternate between an open state and a closed state, wherein the device is connected to the bus via the bus interface when the switch is in the closed state, wherein the device is disconnected from the bus via the bus interface when the switch is in the open state, and wherein communication with one or more other of the plurality of devices subsequent to the device on the bus is interrupted when the switch is in its open state. The method further includes configuring the switch of a device of the plurality of devices from the open state to the closed state, receiving a communication from one or more of the plurality of devices, and determining a wiring topology based on the communication from the one or more of the plurality of devices.

A method according to an embodiment comprises monitoring a bus to identify a sequence in which each of a plurality of devices are coupled to a bus, and determining a wiring topology based on the sequence.

A method according to an embodiment comprises measuring one or more of a current and a voltage on a bus in response to a communication by a device coupled to the bus, determining a wiring impedance between a power supply coupled to the bus and the device, and determining a distance between the power supply and the device based on the determined wiring impedance.

It is to be understood that both the foregoing general description and the following detailed description are exemplary and explanatory only and are not restrictive of the disclosure, as claimed.

BRIEF DESCRIPTION OF THE DRAWINGS

A more complete understanding of the embodiments of the present disclosure may be derived by referring to the detailed description and claims when considered in connection with the following illustrative figures.

DETAILED DESCRIPTION

While exemplary embodiments in this disclosure are described in conjunction with the DALI bus architecture, this disclosure may be used in conjunction with any other suitable bus architecture.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

Exemplary Device with Fault Isolation Switch

Figure 1:
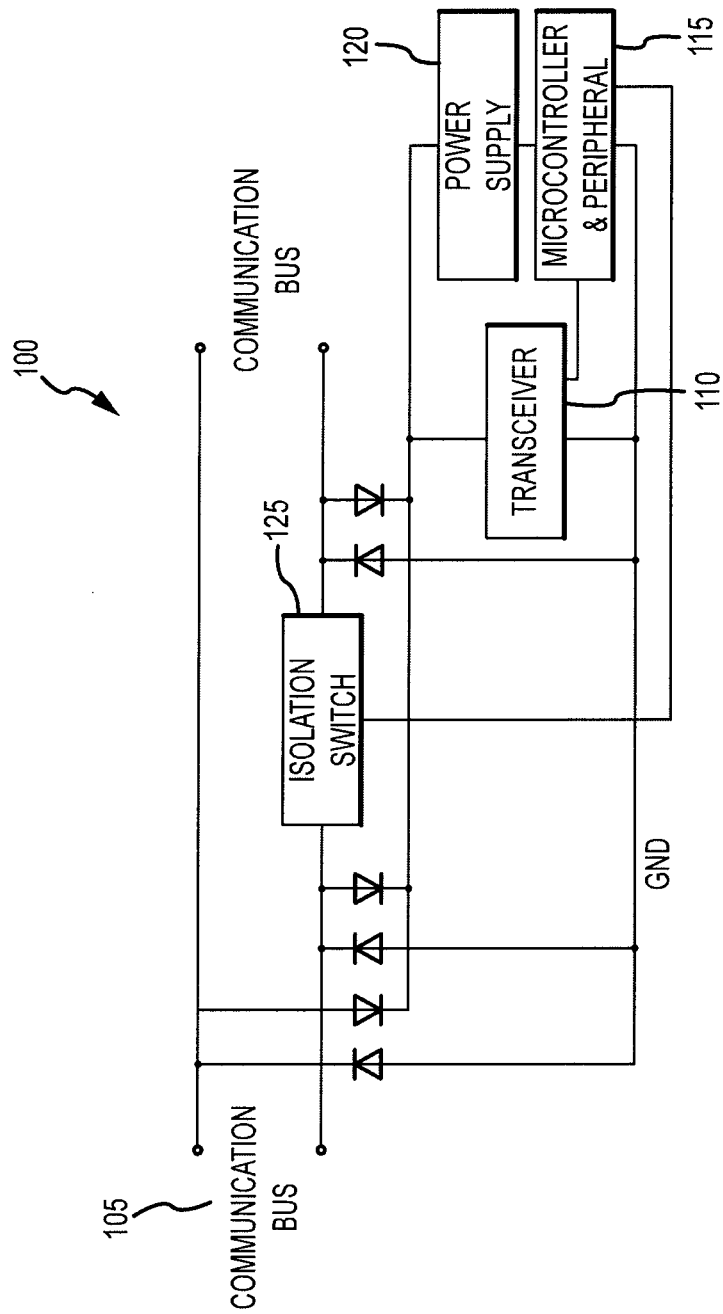
FIG. 1 illustrates an exemplary bus device in accordance with various embodiments.

FIG. 1 illustrates a exemplary embodiment of a network device 100 that can be used with a DALI network or other bus architectures. The device 100 may also be referred to herein as a "node." The device 100 includes a bus interface 105 and a transceiver 110 for transmitting and receiving data via the bus interface 105. Device 100 further includes a microprocessor and peripherals 115 for controlling the device 100 (peripherals may include, among other things, circuitry to create a dimming signal to an external ballast), and a power supply 120 for powering the device 100. Device 100 also includes a switch 125 for connecting and disconnecting the device 100 from the bus via the bus interface 105.

Embodiments of this disclosure may operate in conjunction with any number and type of different devices on a bus. In the exemplary embodiment depicted in FIG. 1, device 100 may be any type of DALI-compatible device, such as a lighting device, sensor, keypad, and/or shade. The device 100 may be configured to perform any other suitable function. For example, the device 100 may be configured to act as a control device in order to facilitate communication between other devices on the bus. In one embodiment, the device 100 may function as a bus arbiter to declare the bus free for any other device(s) on the bus to commence communication (rather than instructing a specific node to respond). Devices according to other embodiments of this disclosure may also be configured to operate with bus architectures such as RS485, Controller Area Network (CAN), and/or Local Interconnect Network (LIN).

Device 100 may include any suitable bus interface 105. In the exemplary embodiment depicted in FIG. 1, bus interface 105 is configured to couple the device 100 to a two-conductor DALI communication bus or other two-conductor bus.

Fault Isolation Switch 125

The switch 125 is coupled to the bus interface 105 and is configured to alternate between an open state and a closed state. When the switch is in the closed state, the device 100 is connected to the bus via the bus interface, and when the switch is in the open state, the device is disconnected from the bus via the bus interface. In the exemplary embodiment depicted in FIG. 1, the communication bus, to which the bus interface 105 connects, uses two conductors. Accordingly, two faults that may occur on this bus include an open circuit and a short circuit between the two conductors. In certain embodiments, the device 100 may be configured to couple to, for example, a CAT5 cable in which case additional open/short permutations could occur by virtue of the CAT5 cable having multiple conductors.

In the embodiment depicted in FIG. 1, switch 125 allows the device 100 to be disconnected from the bus by interrupting one of the two signal wires of the communication bus. Among other things, switch 125 allows installers to isolate open circuits and short circuits. In the case of open circuits, communication to nodes behind, or subsequent to, the open circuit is not possible, thus the location of the open circuit can be identified by identifying the last communicating node on the bus. In the case of a short circuit, a short normally affects all nodes on the bus such that communication with all nodes is preempted. Switch 125, however, allows most of the nodes on the bus to remain functional while helping to isolate the source of the short.

The switch 125 may be implemented in any manner, such as by utilizing mechanical relays or semiconductors (such as MOSFETs). For example, a MOSFET may be implemented at low cost and low power consumption for two-conductor buses (such as a DALI bus). In other cases, such as when the bus coupled to the device includes more than two conductors, a mechanical relay may be advantageous since such relays are available with multiple contacts that can be connected to the conductors of the bus in order to disconnect the device from the bus.

In some bus architectures, if the switch 125 is initially closed when the device 100 is installed, and a short circuit was present on the bus, then no power could be delivered to the node 100. Consequently, the node 100 may not be able to power up or open the switch, preventing the fault from being isolated. Accordingly, in one embodiment, the switch 125 is configured to remain open by default until configured into its closed position. During the power up phase, the node 100 will then close its switch 125 and monitor for conditions of a fault. In the case of a DALI communication, the bus would appear shorted (no voltage) upon closing the switch 125. As described in more detail below, a node 100 may also include circuitry to monitor the bus and determine other adverse conditions such as increases in noise. If a node 100 detects such conditions, it will open its switch 125 again and thereby isolating the fault (which would otherwise prevent any communication). The node 100 would then (actively or upon request) communicate this condition to facilitate troubleshooting.

Figure 2:
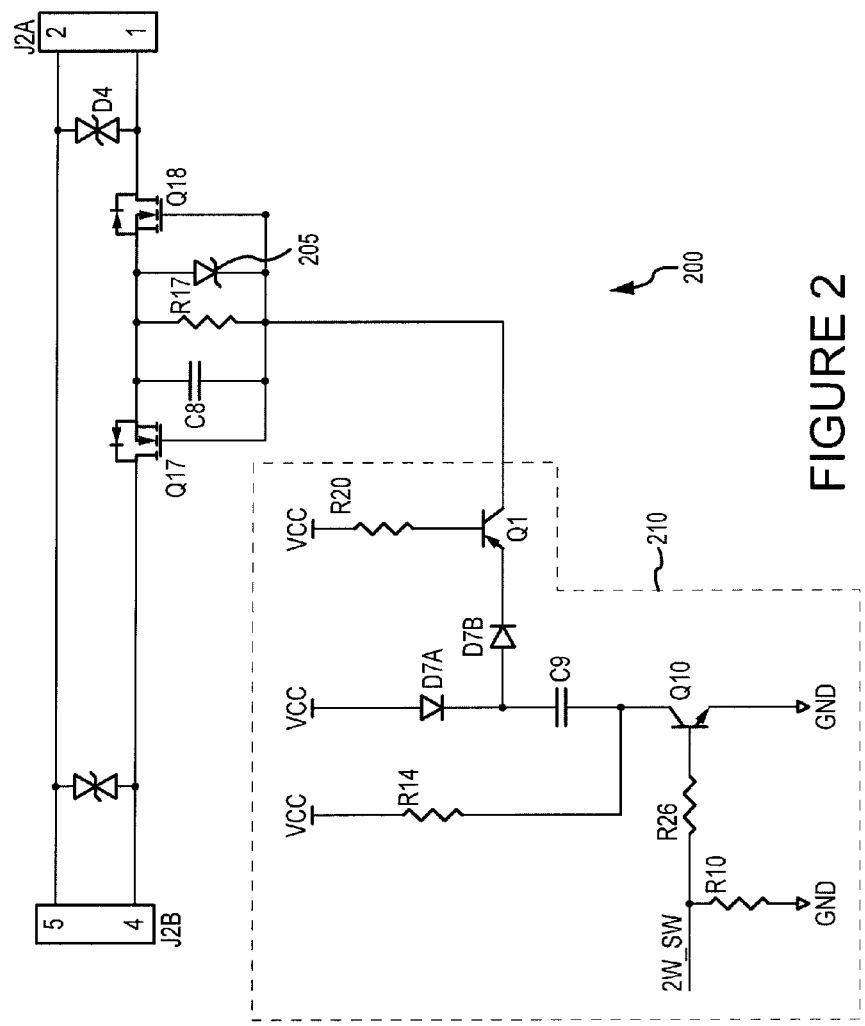
FIG. 2 depicts an exemplary switch circuit for use in bus devices in accordance with various embodiments.

An exemplary embodiment of the switch 125 is depicted in FIG. 2. In this embodiment, switch 200 includes connectors J2A and J2B that connect to a two-conductor bus via the bus interface 105. One conductor of the bus passes through from terminal 6 to terminal 1, while the other conductor passes from terminal 4, via MOSFETs Q17 and Q18, to terminal 1. MOSFETs Q17 and Q18 may be controlled to either pass the signal or isolate the signal. MOSFETs Q17 and Q18 are configured back-to-back such that the internal body diodes cannot form a conductive path. C8 stores a voltage across the MOSFETs' gate-source, while R17 discharges C8 in order to open the bus isolation switch. The zener diode 205 protects the gates Q17 and Q18 from excessive voltage.

In operation, if the MOSFETs (Q17 and Q18) interrupt the negative signal path, a gate voltage higher than the MOSFETs' (Q17 and Q18) gate-source threshold voltage is applied to turn them on. If the MOSFETs interrupt the positive signal path, the voltage at the MOSFETs' (Q17 and Q18) respective gates must be higher than the sum of the gate-source-threshold and the positive signal amplitude. This higher voltage can be derived by the charge pump 210.

In order to activate the charge pump 210, a microcontroller (not shown) toggles 2W_SW, in turn turning Q10 on and off. While Q10 is on, C9 charges via D7A to VCC. While Q10 is off, the negative terminal of C9 is raised to VCC via R14. C9 then discharges into C8 via D7B and Q1. Once C8 is sufficiently charged, the MOSFETs (Q17 and Q18) turn on. To turn off the switch, the microcontroller ceases to toggle 2W_SW and C8 discharges via R17. Q1 and R20 prevent turning on the switch in the configuration with the negative signal path is interrupted. Without it, C8 would charge uncontrolled via D7A and D7B.

The device 100 may be configured to alternate its switch 125 between the open state and closed state in any suitable manner. For example, the switch 125 can be controlled via the microcontroller 115 of the device 100. Additionally (or alternately), the device 100 may be configured to alternate the states of the switch 125 in response to a signal from another device via the bus. The device 100 may be configured to leave the switch 125 in its open or closed state indefinitely (e.g., until receipt of a second signal indicating the switch 125 should be alternated to the other state) or for a predetermined period of time and then alternate to the other state. The switch may also be configured to remain in one state (e.g., the open state) for a predetermined period of time, after which it remains in the other state (e.g., the closed state) indefinitely.

The device 100 may be configured to detect any form of fault, such as wiring faults, short circuits between the conductors of the cable, open circuits, wire loops, breaks, and interference. Open and short circuits may be detected using the device 100 as described previously. Additionally, circuitry for detection of faults can be integrated into the device 100. Upon power up, the device 100 closes its switch 125 and observes the bus. If the bus appears faulty, the device 100 is configured to open its switch 125, thereby isolating the fault. In an embodiment, where the device 100 acts as a control device on the bus, the device 100 may be configured to instruct other nodes on the bus to temporarily close their respective switches. During this time, the control device can assess the bus conditions to identify faults. After a predetermined period of time, or when instructed to by the control device, each node on the bus configure its switch from the closed position to the open position. In some cases, such as where conditions are suitable for communication over the bus, the control device may instruct a node to permanently close its switch in order to bring a fault condition to an installer's attention.

Detecting Bus Network Topology

As discussed above, knowledge of the topology of a bus network is often very important. For example, in order to dim lights (e.g., connected to a DALI network in a building) in response to daylight, it can be important to know which of the lighting nodes are located near windows of the building and which lighting nodes are located interior to the building.

In a conventional DALI installation, a software tool is used to show the unique address of each node that has been discovered on the bus. Installers then instruct the node to cycle its lights on and off and attempt to locate which lights are cycling on and off. In some instances, such as an open warehouse, this process is relatively efficient. In other cases, such as in an office building, it is often difficult to determine which lights are cycling without extensive manual investigation, making the process very time consuming and, consequently, very expensive.

Among other things, embodiments of this disclosure can help determine the topology of the network to expedite the process of physically locating nodes, particularly in cases (such as many lighting installations) where an installer connects nodes in an ordered fashion (e.g., the installer follows hallways and wires all the nodes within one office before moving to another). As the physical locations of nodes are determined, they can be entered into a floor plan through a UI on a tablet PC in a process called "mapping."

In one embodiment, nodes equipped with a fault isolation switch (such as node 100 in FIG. 1) can be used to determine the wiring topology, as well as to isolate faults as described above. In this embodiment, the switches 125 of all devices 100 on a bus are opened. As a result, only the node 100 directly connected to a master control unit can be seen on the bus (all subsequent nodes are disconnected). A signal is sent by the master control unit to the first node to configure its switch to the closed position, allowing the identification of the next subsequent node on the bus. It is possible that two or more nodes appear as a switch is closed, indicating that the communication bus has been branched, in which case each branch can be investigated separately. This procedure can also detect loops, were a communication bus branches off just to rejoin the initial branch at some location further down.

In some embodiments, it is not necessary that all nodes on a bus include a fault switch 125 or are otherwise capable of being selectively connected and disconnected from the bus in order to determine faults or topology. For example, the switch may be included in a subset of nodes to reduce system cost. In such cases, a specific fault may not be able to be traced to a single node, rather to a group of nodes. In practice, however, this uncertainty may not pose a problem where the group of nodes are within a reasonable vicinity of each other.

In order to prevent nodes far down the communication bus from being disconnected (and thus non-functional) for long periods of time during the topology detection process, each node can be instructed to open its switch only temporarily. In one embodiment, the switch for each node can be configured to remain open for a predetermined period of time such that the internal power supplies (or energy storage devices) of the nodes can power the nodes. In a DALI lighting control system, for example, this allows the lighting to remain fully functional during the topology detection process. Moreover, as nodes are added to the system, the location of the new node relative to other nodes can be determined without interrupting operation of the lighting control system. During the period of temporary disconnection, a command may be broadcasted. For example, the command may instruct those nodes that can still communicate to set a flag. In one embodiment, the commands are relatively short such that the duration of the disconnection is likewise short. Then, when the switch is closed again, the system may determine which nodes have their flag set and which don't. Those nodes that don't have their flag set are located behind the node that temporarily disconnected the switch.

In an embodiment, nodes may be configured to detect a temporary loss of power and set a flag upon such an event. One node is then instructed to temporarily open the switch, where upon nodes behind said node set their flag. Then, when the switch is closed again, the system determines which nodes saw the temporary disconnection and which didn't.

In an embodiment, communications from nodes on the bus can be monitored to determine the wiring topology of the bus. For example, a command can be issued onto the bus such that any nodes that receive the command will respond with a communication (e.g., via transceiver 110). With knowledge of nodes having their switches in the open or closed states, and by identifying the nodes on the bus from which such a communication is received, (i.e., which nodes saw the command and which did not) the bus topology can be determined.

Figures 3A, 3B, 3C:
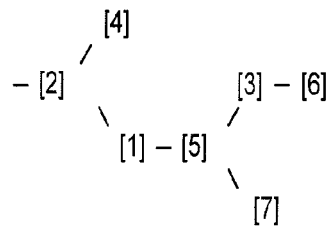
FIGS. 3A-3C illustrate a method for determining bus topology in accordance with various embodiments.

FIGS. 3A-3C illustrate an example of determining wiring topology according to embodiments. FIG. 3A depicts the actual wiring topology of nodes [1] through [7]. The switch 125 for each node is opened, and the nodes with which communication is interrupted is determined. For example, referring now to FIG. 3B, the switch 125 for node [1] is opened, resulting in communication with nodes [3], [5], [6], and [7] being interrupted. The switch 125 for node [1] is then closed and the switch 125 for node [2] is opened, and so forth through each of the nodes, yielding the table in FIG. 3B.

Based on the results in FIG. 3B, identify a group of child nodes for each node (X). For each of the child (Y) in the group, remove those nodes from the group that are also children of Y. For example, for node X=5, the group of children is nodes 3, 6, and 7. Removing the nodes from the group that appear as children of Y yields:

Y=3 removes 6

Y=6 removes none

Y=7 removes none. The remaining children in the group are thus nodes 3 and 7.

The remaining nodes indicates the direct children of a node. As can be verified in the actual topology diagram in FIG. 3A, nodes 3 and 7 are indeed the direct children of node 5. Table 3C depicts the results of this process for each of the nodes, which can be used to depict the topology of the bus (e.g., using a tree structure as shown in FIG. 3A).

In certain embodiments, such as determining a bus topology for a computer system bus, it may be more desirable to identify the parent nodes rather than an arbitrary number of children. That is, identifying that Node X is the parent of those nodes remaining in the group of children. In the above example, node 5 is parent to node 3 and 7.

Additionally, or alternately, the topology of a bus can be determined based on monitoring the sequence in which devices are connected to the bus. As described earlier, embodiments can be used to determine bus topology while the system is operational. In such cases, the bus can be monitored and the addition of nodes detected and their sequence of addition noted. In this embodiment, the sequence in which nodes are connected to the system can be used to determine the wiring topology, particularly where the nodes are added in a daisy chain configuration. This method may also complement other topology scanning methods. For example, where (as described above) only a certain percentage of nodes include a switch, the sequence in which nodes are added can help determine the topology in between the nodes with switches.

Additionally, the electrical characteristics of a bus of any suitable bus architecture may be used to help determine the wiring topology of the bus. In one embodiment, the topology of a DALI bus can be determined using the measured wiring impedance of the bus between a power supply coupled to the bus and a device coupled to the bus.

Figure 4:
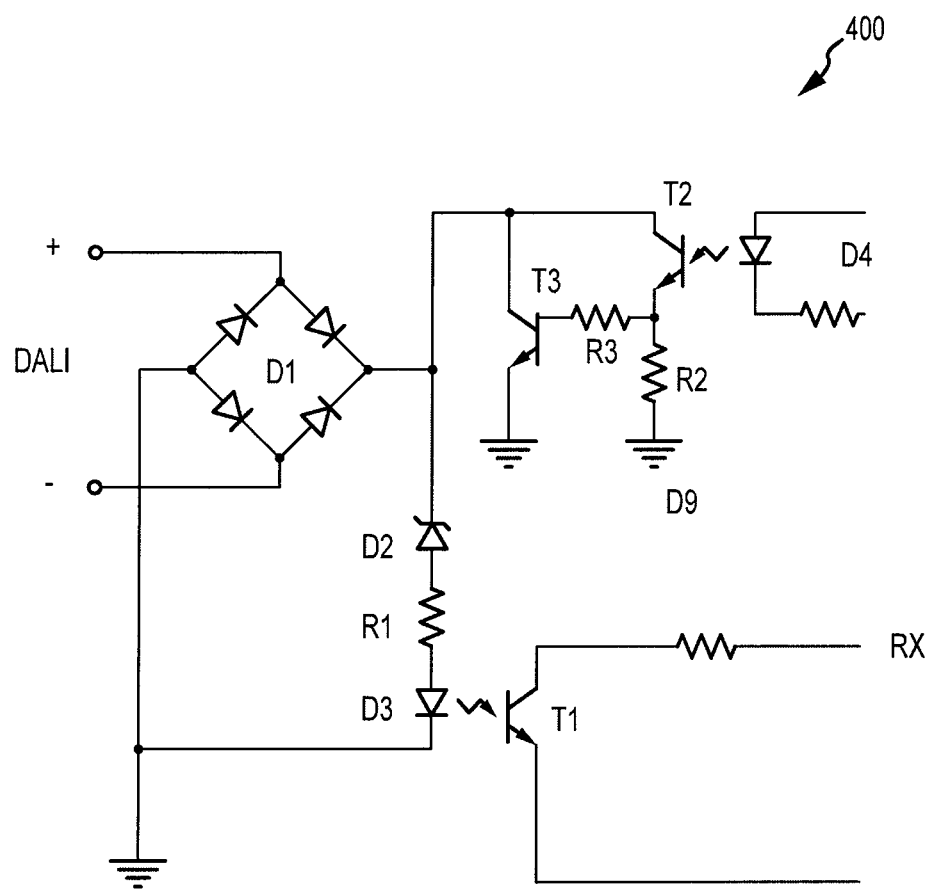
FIG. 4 depicts a typical prior art transceiver section for a DALI node.

FIG. 4 depicts a typical transceiver section 400 for a DALI node. In this example, the bridge D1 rectifies the DALI signal and makes the transceiver polarity insensitive. During a logical one, voltage is present at the DALI lines and is high enough so zener diode D2 conducts. Consequently, LED D3 on the receive optocoupler illuminates and, transistor T1 conducts. The microcontroller recognizes this via the RX pin. Resistor R1 limits current through D3. During a logical zero, the voltage on the DALI line is too low for D2 to conduct, and therefore D3 and T1 will be off.

As described previously, a node must short the DALI lines in order to generate a logical zero on the bus. During a logical one, the bus is simply left un-shorted. In order to create a logical zero, the microcontroller for the device (not shown) passes current through D4, in turn causing T2 to conduct. In turn, a current is provided through R3 into the base of T3 which then shorts the DALI bus through the bridge rectifier D1.

At the power supply (not shown), a reading of current and voltage can be recorded while the DALI device shorts the bus. The voltage reading can be adjusted by an offset based on a characteristic such as the manufacturer, model, device type, and/or any other characteristic that may influence the measured voltage when the device communicates. In one embodiment, the device's manufacturer and model information is retrieved via the communication bus and a looked up in a database to obtain the offset for the device. Once the voltage has been adjusted, the wire impedance between the power supply and the device can be calculated according to Ohm's law. The wire impedance is proportional to the length of wire, allowing the distance to each node to be determined. This can thus help determine the wiring topology of a bus, even in cases where the nodes are not equipped with the above-described fault isolation switch.

In an example, referring again to FIG. 4, the node creates a (largely current independent) voltage drop of two diode drops in the bridge rectifier D1 and another base-emitter drop in T3, or approximately 2.1 Volt (V[Offset]). During a logical zero, the power supply may lower the voltage to a level of V[zero] in order to limit the current to 250 mA. The wiring impedance, which is proportional to the wire length l, is then derived via the following equation:

$$l \sim R = (V[\text{zero}] - V[\text{offset}])/250 \text{ mA}$$

Node with Installation Mode

As discussed previously, a communications system can experience a variety of different fault conditions, many of which can be difficult to localize. Conventional diagnostic equipment is often expensive, delicate, and/or difficult to operate. Moreover, even when conventional systems detect a fault, determining the exact location of the fault can still be tedious and time consuming.

In one embodiment of the disclosure, a bus device (such as device 100 in FIG. 1, with or without isolation switch 125) is configured to power up in an "installation mode" to help identify faults as an installer wires the device to a live (powered) bus. As devices (or "nodes") are added to the bus, a system (such as a computer system coupled to the bus) monitors the bus and keeps an inventory of each node and its type.

The computer system can further transmit a communication to the node, which is received by the node (e.g., by transceiver 110). The communication is validated by the node and, if the validation is successful (indicating the node is functional and installed properly), the node may activate one or more of its features. Features of a node can be activated in any suitable manner, such as being alternately activated and deactivated repeatedly, activated for a predetermined period of time and then deactivated, and/or activated/deactivated in combination with other features of the node. For example, keypads may feature LED indicators that generate a visual indicator (such as flashing the indicators a number of times). Nodes connected to lighting devices may generate a visual indicator that includes cycling the lights on and off a number of times. The node may also generated an audible indicator, such as a sound played through a speaker coupled to the node or an audible "clicking" of a mechanical relay of the node as it cycles lights. A node may generate any combination of visual and/or audible indicators.

In this manner, the audible and/or visual indicators generated by the node provide immediate feedback to the installer that the installation of the node is (or remains) functional. If a node fails to generate the indicators, the installer knows that a fault must be present between the last successfully detected node and the recently installed one. This embodiment may also be particularly effective in detecting intermittent faults, such as may be caused by a loose or improperly seated connector.

In an embodiment directed to a lighting system, a plurality of devices coupled to a bus include a keypad and a lighting device. In response to a communication from the keypad over the bus (e.g., due to a button being pushed on a keypad), the lighting device is configured to alternate between two or more states. For example, the lighting device may cycle between the states of high brightness, low brightness, and off. Among other things, this cycling helps demonstrate to the installer that nodes are both capable of communication and correctly wired to the lighting device's ballast or LED driver. In this embodiment, any number of keypads and lighting devices can be tested. All lights can be cycled simultaneously, individually, or in groups.

The above-described embodiments may be implemented in any manner, such as through hardware, software, or a combination of the two. Functionality implemented through software may be performed by any suitable computer-based system. Such a software program may be stored on any computer-readable medium, such as floppy disks, hard disks, CD-ROMs, DVDs, any type of optical or magneti-optical disks, volatile or non-volatile memory, and/or any other type of media suitable for storing electronic instructions and capable of interfacing with a computing device. Methods according to embodiments of present invention may operate in conjunction with any type of computer system, such as a personal computer (PC), server, cellular phone, personal digital assistant (PDA), portable computer (such as a laptop), embedded computing system, and/or any other type of computing device. The computer system may include any number of computing devices connected in any manner, such as through a distributed network. The computer system may communicate and/or interface with any number of users and/or other computing devices to send and receive any suitable information in any manner, such as via a local area network (LAN), cellular communication, radio, satellite transmission, a modem, the Internet, and/or the like.

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Furthermore, the connecting lines shown in the various figures are intended to represent exemplary functional relationships and/or physical couplings between the various elements. Many alternative or additional functional relationships or physical connections may be present in a practical system.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A device comprising:
    a bus interface to connect the device to a bus;
    a transceiver to transmit and receive data via the bus over the bus interface; and
    a fault isolation switch connected to the bus interface, where the fault isolation switch has an open state and a closed state, such that when the fault isolation switch is in the open state, the bus interface is disconnected from the bus and the transceiver is unable to transmit or receive data via the bus, and when the fault isolation switch is in the closed state, the bus interface is connected to the bus and the transceiver is able to transmit and receive data via the bus, wherein the fault isolation switch further comprises a fault detection circuit, wherein the fault detection circuit is configured to identify a fault associated with the bus, and to alternate the fault isolation switch to the open state in response to identifying the fault.

2. The device of claim 1, wherein the fault detection switch has an initial operation mode and a steady operation mode, and the fault detection switch is configured to default to the open state while in the initial operation mode.

3. The device of claim 1, wherein the fault isolation switch is configured to alternate between the open state and the closed state in response to a signal received from the bus via the bus interface.

4. The device of claim 3, wherein the fault isolation switch is configured to remain in the open state or the closed state until receipt of a second signal from the bus via the bus interface.

5. The device of claim 1, further comprising a microcontroller, wherein the microcontroller is configured to control the device and to provide output signals to a further device to which the device is connected.

6. The device of claim 1, wherein the fault isolation switch further comprises:
    a first connector and a second connector;
    a first switch and a second switch;

a capacitor, a resistor, and a Zener diode in parallel with each other and connected between the first switch and the second switch; and a charge pump;

wherein the charge pump is configured, upon activation, to charge the capacitor, turning the first switch and the second switch on, and thus turning on the fault isolation switch, and upon deactivation, to allow the capacitor to discharge through the resistor, turning the first switch and the second switch off, and thus turning off the fault isolation switch.

7. A system, comprising:

a system bus;

a power supply connected to the system bus;

a plurality of devices connected to the system bus, wherein each device in the plurality of devices includes:
  a bus interface to connect the device to a bus;
  a transceiver to transmit and receive data via the bus over the bus interface; and
  a fault isolation switch connected to the bus interface, wherein the fault isolation switch has an open state and a closed state, such that when the fault isolation switch is in the open state, the bus interface is disconnected from the bus and the transceiver is unable to transmit or receive data via the bus, and when the fault isolation switch is in the closed state, the bus interface is connected to the bus and the transceiver is able to transmit and receive data via the bus;

a luminaire, wherein the luminaire comprises a light source to provide illumination and a lighting power source to provide power to illuminate the light source, and wherein the luminaire is connected to a device in the plurality of devices, such that operation of the luminaire is controlled by the connected device; and a control device, comprising:
  a bus interface to connect the control device to the system bus;
  a communications device connected to the system bus through the bus interface, the communications device configured to transmit and receive data via the bus interface;
  a processor connected to the bus interface and the communications device; and
  a memory system connected to the processor, wherein the memory system stores instructions that, when executed by the processor, cause the control device to perform operations of:
    receiving, from the system bus by the communications device via the bus interface, a communication from a device in the plurality of devices that is connected to the luminaire;
    validating the communication to produce an action result; and
    in response, based on the action result, transmitting a command to the device in the plurality of devices that is connected to the luminaire that causes the luminaire to generate a visual indicator via the light source of the luminaire;

wherein each fault isolation switch further comprises:
  a first connector and a second connector;
  a first switch and a second switch;
  a capacitor, a resistor, and a Zener diode in parallel with each other and connected between the first switch and the second switch; and
  a charge pump;

wherein the charge pump is configured, upon activation, to charge the capacitor, turning the first switch and the second switch on, and thus turning on the fault isolation switch, and upon deactivation, to allow the capacitor to discharge through the resistor, turning the first switch and the second switch off, and thus turning off the fault isolation switch.

8. The system of claim 7, wherein transmitting comprises:
  in response, based on the action result, transmitting a command to the device in the plurality of devices that is connected to the luminaire that causes the luminaire to generate a visual indicator by alternately activating and de-activating the light source of the luminaire.

9. The system of claim 7, wherein validating comprises:
  validating the communication to produce an action result, wherein the action result includes a command to device in the plurality of devices that is connected to the luminaire, wherein the command will cause the device to control the luminaire to generate a visual indicator via the light source of the luminaire;

and wherein transmitting comprises:
  in response, transmitting the command in the action result to the device in the plurality of devices that is connected to the luminaire, such that the device controls the luminaire according to the transmitted command.

10. The system of claim 7, further comprising:
  a lighting control device that is configured to receive input, wherein the lighting control device is connected to the luminaire, such that operation of the luminaire may be controlled by the lighting control device, the device in the plurality of devices connected to the luminaire, or both the lighting control device and the device in the plurality of devices connected to the luminaire, and wherein the lighting control device is connected to a device in the plurality of devices, such that operation of the lighting control device may be controlled by the received input, the connected device, or both the received input and the connected device;

and wherein the memory system stores instructions that, when executed by the processor, cause the control device to perform operations of:
  receiving, from the system bus by the communications device via the bus interface, a communication from the device in the plurality of devices that is connected to the lighting control device;
  validating the communication to produce an action result; and
  in response, based on the action result, transmitting a command to the device in the plurality of devices that is connected to the luminaire that causes the luminaire to operate based on the transmitted command to generate a visual indicator.

11. The system of claim 10, wherein transmitting comprises:
  in response, based on the action result, transmitting a command to the device in the plurality of devices that is connected to the lighting control device that causes the lighting control device to operate the luminaire based on the transmitted command to generate a visual indicator.

\* \* \* \* \*